(12) United States Patent
Helvik et al.

(10) Patent No.: US 11,586,642 B2
(45) Date of Patent: *Feb. 21, 2023

(54) DISTANT CONTENT DISCOVERY

(71) Applicant: Microsoft Technology Licensing, LLC, Redmond, WA (US)

(72) Inventors: Torbjørn Helvik, Oslo (NO); Michael James Taylor, Cambridge (GB); Vishwa Vinay, Bangalore (IN); Vidar Vikjord, Tromso (NO); Viral Shah, Oslo (NO); Ashok Kuppusamy, Oslo (NO); Bjørnstein Lilleby, Tromso (NO)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/317,969

(22) Filed: May 12, 2021

(65) Prior Publication Data

US 2021/0263917 A1 Aug. 26, 2021

Related U.S. Application Data

(63) Continuation of application No. 16/057,229, filed on Aug. 7, 2018, now Pat. No. 11,030,208, which is a (Continued)

(51) Int. Cl.
*G06F 16/248* (2019.01)
*G06F 16/9535* (2019.01)
(Continued)

(52) U.S. Cl.
CPC ...... *G06F 16/248* (2019.01); *G06F 16/24575* (2019.01); *G06F 16/24578* (2019.01);
(Continued)

(58) Field of Classification Search
None
See application file for complete search history.

(56) References Cited

U.S. PATENT DOCUMENTS 7,143,091 B2 11/2006 Charnock et al.
8,615,442 B1 12/2013 Kapur et al.
(Continued)

OTHER PUBLICATIONS

"Notice of Allowance Issued in U.S. Appl. No. 16/895,056", dated Aug. 5, 2021, 11 Pages.
(Continued)

*Primary Examiner* — Kim T Nguyen

(57) ABSTRACT

Generating and providing a content feed to a user that surfaces information items that are determined to be interesting or relevant to the user including content that is determined to be "distant" to the user is provided. Explicit user actions are used to discover peers who are not colleagues of the user (e.g., peers with whom the user does not share a close organizational relationship, peers with whom the user does not regularly communicate, etc.), but who the user indicates an interest in via his/her actions. These peers are categorized as elevated peers of the user, and information items associated with and trending around the elevated peers are surfaced to the user in a content feed.

20 Claims, 11 Drawing Sheets

Related U.S. Application Data continuation of application No. 14/645,538, filed on Mar. 12, 2015, now Pat. No. 10,061,826.

(60) Provisional application No. 62/046,602, filed on Sep. 5, 2014.

(51) Int. Cl.
  *G06F 16/2457* (2019.01)
  *G06Q 10/10* (2023.01)
  *G06Q 50/00* (2012.01)

(52) U.S. Cl.
  CPC ......... *G06F 16/9535* (2019.01); *G06Q 10/10* (2013.01); *G06Q 50/01* (2013.01)

(56) References Cited

U.S. PATENT DOCUMENTS

| | | | |
|---|---|---|---|
| 8,996,629 | B1 | 3/2015 | Datar et al. |
| 9,223,835 | B1 | 12/2015 | Mazniker et al. |
| 10,061,826 | B2 * | 8/2018 | Helvik ................. G06F 16/248 |
| 11,030,208 | B2 * | 6/2021 | Helvik .............. G06F 16/24575 |
| 11,308,456 | B2 * | 4/2022 | Beyer ..................... G06Q 10/20 |
| 11,308,919 | B2 * | 4/2022 | Morris .................. G06F 3/1446 |
| 2008/0091549 | A1 | 4/2008 | Chang et al. |
| 2010/0312842 | A1 | 12/2010 | Ladouceur et al. |
| 2011/0153619 | A1 | 6/2011 | Carter et al. |
| 2012/0066618 | A1 | 3/2012 | Barker et al. |
| 2012/0167010 | A1 | 6/2012 | Campbell et al. |
| 2012/0223951 | A1 | 9/2012 | Dunn et al. |
| 2013/0124257 | A1 | 5/2013 | Schubert |
| 2014/0032664 | A1 | 1/2014 | Wookey |
| 2014/0074856 | A1 | 3/2014 | Rao |
| 2014/0195977 | A1 | 7/2014 | Chang et al. |
| 2014/0351263 | A1 | 11/2014 | Mcconnell et al. |
| 2015/0046515 | A1 | 2/2015 | Pei et al. |
| 2016/0070764 | A1 * | 3/2016 | Helvik .............. G06F 16/24575 707/734 |
| 2017/0091644 | A1 * | 3/2017 | Chung ................. G06Q 10/101 |
| 2017/0212931 | A1 | 7/2017 | Chen et al. |
| 2018/0349452 | A1 * | 12/2018 | Helvik .............. G06F 16/24578 |
| 2021/0232631 | A1 | 7/2021 | Holm et al. |
| 2021/0263917 | A1 * | 8/2021 | Helvik ................... G06Q 50/01 |
| 2022/0222949 | A1 | 7/2022 | Lv et al. |

OTHER PUBLICATIONS

Aiello, et al., "Sensing Trending Topics in Twitter", In Journal of IEEE Transactions on Multimedia, vol. 15, Issue 6, Oct. 1, 2013, pp. 1268-1282.

Kim, et al., "Evolution of Social Networks Based on Tagging Practices", In Journal of IEEE Computer Society, vol. 6, Issue 2, Apr. 1, 2013, pp. 252-261.

"Notice of Allowance Issued in U.S. Appl. No. 14/192,235", dated Mar. 23, 2022, 20 Pages.

"Non Final Office Action Issued in U.S. Appl. No. 14/192,235", dated Aug. 20, 2021, 17 Pages.

"Final Office Action Issued in U.S. Appl. No. 14/296,747", dated Sep. 10, 2021, 31 Pages.

"Notice of Allowance Issued in U.S. Appl. No. 16/895,056", dated Sep. 20, 2021, 11 Pages.

Pang, et al., "Association-Based Recommendation of Web Information", In Proceedings of International Conference on Systems, Man and Cybernetics, vol. 7, Oct. 6, 2002, 5 Pages.

Tran, et al., "User Interest Analysis with Hidden Topic in News Recommendation System", In Proceedings of International Conference on Asian Language Processing, Dec. 28, 2010, 4 Pages.

"Non-Final Office Action Issued in U.S. Appl. No. 16/895,056", dated Feb. 2, 2022, 17 Pages.

"Non-Final Office Action Issued in U.S. Appl. No. 14/296,747", dated Feb. 17, 2022, 35 Pages.

"Non Final Office Action Issued in U.S. Appl. No. 16/938,065", dated May 10, 2022, 20 Pages.

"Notice of Allowance Issued in U.S. Appl. No. 14/192,235", dated Sep. 1, 2022, 17 Pages.

"Final Office Action Issued in U.S. Appl. No. 14/296,747", dated Jul. 15, 2022, 35 Pages.

"Final Office Action Issued in U.S. Appl. No. 16/895,056", dated Jul. 28, 2022, 18 Pages.

"Final Office Action Issued in U.S. Appl. No. 16/938,065", dated Aug. 16, 2022, 23 Pages.

"Notice of Allowance Issued in U.S. Appl. No. 14/192,235", dated Dec. 1, 2022, 17 Pages.

"Notice of Allowance Issued in U.S. Appl. No. 14/296,747", dated Nov. 15, 2022, 21 Pages.

"Notice of Allowance Issued in U.S. Appl. No. 16/895,056", dated Oct. 19, 2022, 11 Pages.

"Non Final Office Action Issued in U.S. Appl. No. 16/938,065", dated Nov. 21, 2022, 22 Pages.

Lee, et al., "Dynamic Item Recommendation by Topic Modeling for Social Networks,", In Proceedings of Eighth International Conference on Information Technology: New Generations, Apr. 11, 2011, pp. 884-889.

Weng, et al., "Improving Recommendation Novelty Based on Topic Taxonomy", In Proceedings of IEEE/WIC/ACM International Conferences on Web Intelligence and Intelligent Agent Technology-Workshops, Nov. 5, 2007, pp. 115-118.

\* cited by examiner

MOBILE COMPUTING DEVICE

DISTANT CONTENT DISCOVERY

CROSS-REFERENCE TO RELATED APPLICATIONS

This application is a continuation of U.S. patent application Ser. No. 16/057,229, filed Aug. 7, 2018, now U.S. Pat. No. 11,030,208, which is a continuation of U.S. patent application Ser. No. 14/645,538 filed Mar. 12, 2015, now U.S. Pat. No. 10,061,826, which claims the benefit of U.S. Provisional Patent Application No. 62/046,602, titled "Promoting Distant Interesting Content" filed Sep. 5, 2014.

BACKGROUND

Information workers/users have become accustomed to generating, editing, viewing, and receiving large numbers of electronic documents and other information (e.g., electronic communications, images, data, etc.). In an enterprise situation, for example, a company, school, social network, etc., a given user may encounter hundreds (or more) of documents or other information items, each with varying degrees of relevance, interest, or importance to the information worker, and that are oftentimes scattered across a variety of workloads and storage systems (e.g., email, social feeds, intranet sites, network file systems, etc.). Accordingly, it can be time consuming and inefficient for users to search for content that is relevant to them. Additionally, users are oftentimes unaware of relevant or interesting information items that are available to them, for example, content that is trending around other individuals whom the user does not interact with directly or individuals with whom the user does not share a close organizational relationship.

It is with respect to these and other considerations that examples have been made. In addition, although relatively specific problems have been discussed, it should be understood that the examples should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects of the present disclosure are directed to generating and providing a content feed to a user that surfaces information items that are determined to be interesting or relevant to the user including content that is determined to be "distant" to the user. Explicit user actions are used to discover peers who are not colleagues of the user (e.g., peers with whom the user does not share a close organizational relationship, peers with whom the user does not regularly communicate, etc.), but who the user implicitly indicates an interest in via his/her actions. These peers are categorized as elevated peers of the user, and information items associated with and trending around the elevated peers are surfaced to the user in a content feed. Aspects of the present disclosure discover and provide relevant content to users, and therefore, increase user efficiency by enabling users to spend less time searching for content that they need. Additionally, users are able to skip steps that they would normally have to go through to find content for which they are searching, and thus, aspects of the present disclosure reduce network bandwidth.

According to an aspect, examples are implemented as a computer process, a computing system, or as an article of manufacture such as a computer program product or computer readable media. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various aspects of the present invention. In the drawings.

DETAILED DESCRIPTION

Figure 1:
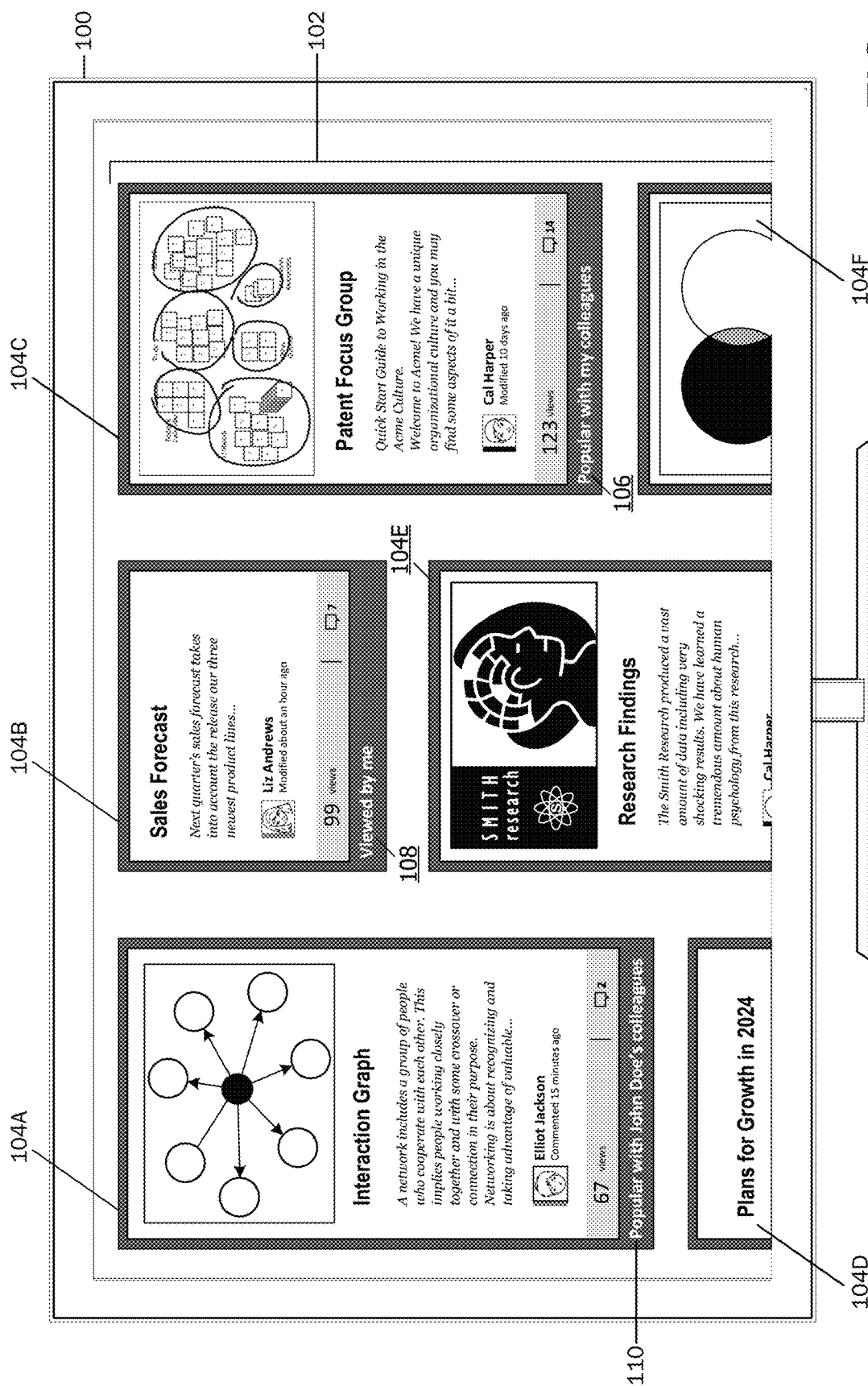
FIG. 1 illustrates a content feed showing a number of information items surfaced to a user, including distant information items.

The following detailed description refers to the accompanying drawings. Wherever possible, the same reference numbers are used in the drawings and the following description to refers to the same or similar elements. While aspects of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims. Examples may take the form of a hardware implementation, or an entirely software implementation, or an implementation combining software and hardware aspects. The following detailed description is, therefore, not to be taken in a limiting sense.

Aspects of a distant content discovery system provide for generating and providing a content feed to a user that surfaces information items that are determined to be interesting or relevant to the user including content that is determined to be "distant" to the user. Explicit user actions are used to discover peers who are not colleagues of the user (e.g., peers with whom the user does not share a close organizational relationship, peers with whom the user does not regularly communicate, etc.), but who the user indicates an interest in via his/her actions. These peers are categorized as elevated peers of the user, and information items associated with and trending around the elevated peers are surfaced to the user in a content feed. FIG. 1 is an illustration of an example content feed 102 of information items 104A-F surfaced to a user. As illustrated in FIG. 1, a number of documents, content items, or other information items (referred to herein as information items 104) are displayed in a content feed 102 on a display surface of a computing device 100. Aspects enable a content feed 102 to include any electronic item of sufficient interest or relevance to the user, for example, documents, images, photographs, electronic mail messages, text messages, telephone call messages, and the like. The computing device 100 illustrated in FIG. 1 is a desktop-style computing device, but as should be appreciated, the content feed 102 is displayable on a display surface of any suitable computing device such as a desktop computer, laptop computer, tablet-style computer, handheld computing device, mobile communication device, and the like.

The information items 104 illustrated in the content feed 102 are graphical representations of information items determined to be interesting or relevant to the user. According to an aspect, information items 104 are displayed in a content feed 102 as content cards, which comprise one or more of: a header, a title, a preview image of the information item 104, information to help the user to understand why the information item 104 would be interesting or relevant to him/her, and selectable link to access the information item 104. According to an aspect, the content feed 102 includes information items 104 that are trending among peers of the user who are not colleagues of the user, but who are considered of interest to the user because of an action taken by the user and thus triggering an elevate signal. An estimate of how interesting or relevant an information item 104 is to a given user is determined by one or more ranking modules.

According to aspects, the one or more ranking modules are operable to estimate relevance of an information item 104 to a user based on: how popular the information item 104 is among the user's colleagues (i.e., information items 104 tagged as "popular with my colleagues" or "PWMC" 106); based on the number of recent views, edits or other interactions of the user with the information item 104 (i.e., information items 104 tagged as "vanity" 108); or based on how popular the information item 104 is among peers of the user who are not colleagues, but who are considered of interest to the user because of an action taken by the user triggering an elevate signal (i.e., information items 104 tagged as "distant" 110). The one or more ranking modules and classification and tagging of information items 104 as "popular with my colleagues" 106, "vanity" 108, and "distant" 110 will be described in further detail below.

According to an aspect, and as described below, the content feed 102 includes different information items 104 that are updated each time the user accesses the content feed 102. According to an aspect, the individual information items 104 displayed in the feed 102 are displayed according to an order of interest or relevance to the user. According to another aspect, the individual information items 104 are displayed in the feed 102 according to how the information item 104 has been tagged (e.g., "popular with my colleagues" 106, "vanity" 108, or "distant" 110). According to an aspect, as new information items 104 are added to the content feed 102, the new information items 104 are added to the front or top of the content feed 102. According to an aspect, individual information items 104 are reposted to different positions in the ordering of displayed information items 104.

According to an aspect, various rules are applied for determining a makeup of a content feed 102. For example, rules can be applied for limiting a size of the content feed 102 to a predetermined number of information items 104. According to another example, rules can be applied for limiting the size of a content feed 102 to a predetermined minimum or maximum percentage of a particular type of tagged content (e.g., a content feed 102 may have a 20% minimal percentage of "distant" content, 40% maximum percentage of "distant" content, etc.). According to another example, rules can be applied for determining the makeup of a user's content feed 102 based on the user's interaction patterns with the content feed 102 (e.g., if the user shows a proclivity for "distant" content, the content feed 102 can be adapted to include a higher percentage of "distant" content).

According to an aspect, individual information items 104 are automatically removed from the content feed 102 if a maximum number of information items 104 have been posted or if a maximum percentage of "popular with my colleagues" 106, "vanity" 108, or "distant" 110 information items 104 have been posted, and the rankings of the individual information items 104 are below the maximum number of items to post according to the posting limit or according to the percentage limit. According to another aspect, individual information items 104 are manually removed from the content feed 102 by the user, if desired.

According to an aspect, the content feed 102 is provided by a software application containing sufficient computer executable instructions for generating the content feed 102 and for displaying the information items 104 making up the content feed 102, as illustrated in FIG. 1. The content feed 102 is accessible from a variety of different access points. According to an aspect, the content feed application operates as a stand-alone application. According to another aspect, the content feed application operates as a module of any of a variety of other applications, for example, word processing applications, spreadsheet applications, slide presentation applications, notes taking applications, desktop publishing applications, and the like for allowing a user to access and display his/her content feed 102, as desired.

Figure 2:
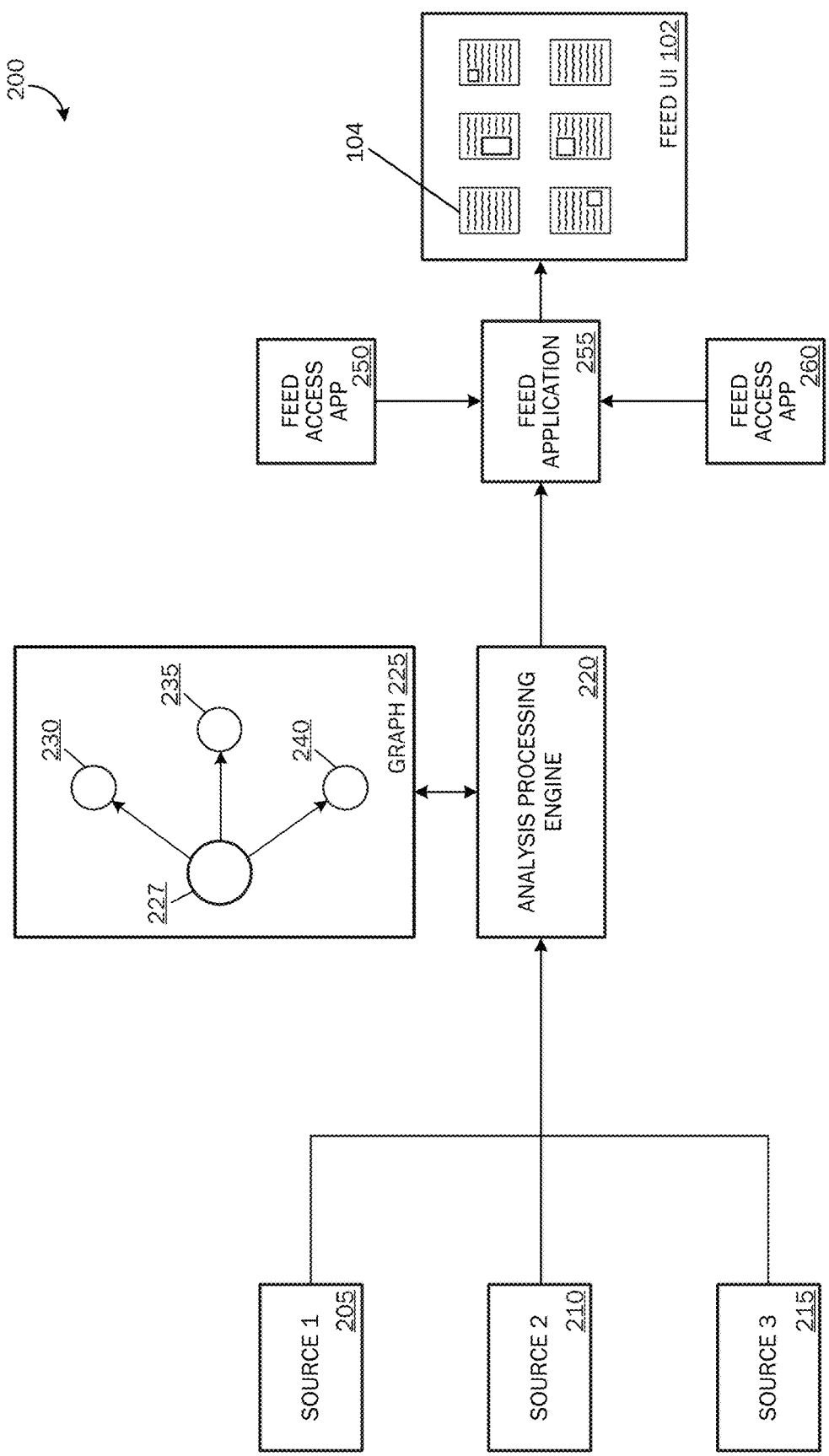
FIG. 2 illustrates one system for determining interest or relevance of an information item for surfacing the information item in a content feed.

FIG. 2 illustrates a system 200 for surfacing information to a user in a content feed 102. According to an aspect, information items 104 making up the content feed 102 for a given user can come from a variety of sources 205, 210, 215. According to an aspect, such information sources 205, 210, 215 include client side information storage sources. According to another aspect, such information sources 205,210,215 include remote storage sources. For example, information items 104 are gleaned from remote servers, local or remote databases, local or remote shared resources repositories, and the like. For example, a first source 205 may be a local client side memory containing documents, images, data files, communications items, such as electronic mail items, text messages, telephone messages, and the like. Similarly, the source 205 may represent a remote cloud-based storage medium that is accessed by one or more client applications. According to an aspect, each information item 104 is stored in association with applications responsible for generating the information types, for example, word processing applications, spreadsheet applications, slide presentation applications, spreadsheet applications, and the like. Communications messages, for example, electronic mail messages may be associated with an electronic mail application, or an Internet-based mail service.

The second source 210 may be illustrative of a variety of other information sources containing information items 104 that can be placed in a content feed 102, such as social networking sites. For example, the source 210 may be a remotely based server system containing information of interest or relevance to a given user maintained for a social networking service accessed by the user. The third source 215 may be illustrative of any other information source from which information items 104 as described herein may be collected and analyzed for their interest or relevance to a given user and for potential surfacing to the user in a content feed 102. As should be appreciated, the information sources 205, 210, 215 are for purposes of illustration only and are not limiting of the vast numbers of local and networked information sources from which information items 104 are retrieved for analysis and for inclusion in a content feed 102, as described herein.

As illustrated in FIG. 2, an analysis processing engine 220 retrieves and aggregates information items 104 from the various sources 205, 210, 215 for analysis. That is, after information is retrieved and aggregated from the various information sources 205, 210, 215, the analysis processing engine 220 is operable to a determine the importance, interest, or relevance of each information item 104 to a given user for possible inclusion in the user's individualized content feed 102. As will be described below, each content feed is analyzed with respect to each individual user so that the information items 104 surfaced to the user in the user's personalized content feed 102 are those items that are determined to be interesting, important, or relevant to the individual user.

Referring still to FIG. 2, information items 104 analyzed by the analysis processing engine 220 are built into a graph 225. According to an aspect, a user is an individual user. According to another aspect, a user is a group comprised of a formalized set of individuals according to an organizational hierarchy or project structure. According to another aspect, a user is a group comprised of a less formally coupled set of individuals, such as a group of individuals who are common attendees of a particular meeting, a project group, a group of individuals who share a common interest in a particular topic, etc.

Nodes 227, 230, 235, 240 of the graph 225 represent different persons/users or information items 104. Relationships between the users and between users and information items 104 are be represented in the graph 225 in the form of edges, where the edges are representative of relationship types based on activity signals between users and between users and information items 104. For example and as will be described in greater detail below, a person-person relationship may be tagged as a colleague relationship or as an elevated peer relationship. According to an aspect, activity signals are used for determining a relevance or interest of a given document or information item 104 to a user. For example, if a user views a document that was generated by a person in the user's organization, the activity of viewing the person's document generates an elevate signal and is used for determining that the person is a person of interest to the user. Accordingly, the analysis processing engine 220 is operable to include information items 104 created by or trending around the person of interest in a content feed 102 for the user. According to an aspect, the graph 225 is illustrative of an index that points to storage locations where each information item 104 that will populate the feed 102 is located. According to another aspect, the graph 225 is illustrative of a storage location at which each information item 104 that will populate the feed 102 is stored after being identified for inclusion in the feed 102.

As should be appreciated, the process of retrieving information and information items 104 from various information sources 205,210,215, analysis of the information, and representation of relationships between people and information items 104 in the graph 225 as edges and nodes is an iterative process that is updated as new information sources become available. That is, as will be described below, when an individual user accesses his/her content feed 102, the user's content feed 102 will be comprised of those information items 104 having sufficient ranking for inclusion in the feed 102 at the time of access to the feed. Upon a subsequent access to the content feed 102, the feed may include information items 104 that have been subsequently added to the graph 225 through analysis of additional information items 104.

Referring still to FIG. 2, the feed application 255 is an application operable for extracting the information items 104 from the graph 225 for generating the content feed 102 and for displaying the information items 104 comprising the present instance of the content feed 102 in a user interface, as illustrated above with reference to FIG. 1. The feed access applications 250, 260 are illustrative of one or more applications that are operable for accessing the functionality of the feed application 255. According to an aspect, the feed application 255 operates as a stand-alone application for creating and displaying a given content feed 102. Alternatively, according to another aspect, functionality for accessing the feed application 255 is operated as a software module of other applications, for example, word processing applications, spreadsheet applications, slide presentation applications, and the like such that a user is enabled to access and display his/her content feed 102 from any of these types of software applications.

According to an aspect, the components of the system 200 illustrated in FIG. 2 for generating and displaying a content feed 102 operate as a collection of software modules and data sources operating at a single client side computing device. According to another aspect, the components of the system 200 operate at locations remote to each other such that the system 200 is operated over a distributed computing network, such as the Internet. For example, the information sources 205, 210, 215 may be maintained at various local or remote memory storage areas, the analysis processing engine 220 may operate at a location remote from the graph 225, and the feed application 255 and the various feed access applications 250, 260 may operate as client side applications or as remotely housed applications accessible at a client computing device.

As described above, information items 104 are analyzed by the analysis processing engine 220 for inclusion in a particular user's content feed 102 to determine if a particular information item 104 is interesting, important, or relevant to the particular user. As will be described below, each information item 104, when analyzed, is provided with a ranking or score. For example, the ranking or score is used for deciding a top X number of information items for inclusion in a given instance of the content feed 102.

According to an aspect, all items having a score at or above a given threshold are included in a user's feed 102.

When the content feed 102 is generated, the information items 104 included in the content feed 102 are ordered based on the rankings or scores determined for each information item 104. The number of information items 104 included in an initial instance of the content feed 102 may be a top X scored or ranked items, for example, the top ten scored or ranked items.

According to another aspect, the number of information items 104 posted to a content feed 102 are based on the time since the user last refreshed the feed. For example, the number of information items 104 to post equals $N(t)=M*t/(t+\lambda)$, where M is the saturation value (maximum number of information items 104 to post), and $\lambda$ is the number of hours until half of M is reached. Each time a user accesses his/her content feed 102, a next top X number of newly analyzed information items 104 are added to the content feed 102 based on their scores or rankings.

According to another aspect and as described above, a number of information items 104 included in a content feed 102 is based on a predetermined minimum or maximum percentage of a particular type of tagged content (e.g., a 20% minimal percentage of "distant" content, 40% maximum percentage of "distant" content, etc.). According to another aspect and as described above, the makeup of a content feed 102 is adaptable according to the user's interaction patterns with the content feed 102.

As described above, the analysis processing engine 220 is operable to analyze various types of information items 104 for inclusion in a content feed 102, for example, documents, images, electronic communications, datasets, and the like. According to an aspect, when analyzing an individual information item 104 for ranking or scoring the individual information item 104 for possible inclusion in the content feed 102, various attributes of an information item 104, an activity performed on the information item 104, and relationships between people associated with the information item 104 are used for determining a particular ranking or score for the information item 104.

As a first example, a factor used for ranking or scoring an individual information item 104 includes whether the information item 104 is generated by or acted on by the user for which the content feed 102 is being created. As a next example, the type of action performed by the user is utilized as a factor. As another example, a factor used for ranking or scoring an information item 104 includes whether the information item 104 has been acted on by a colleague of the user. As another example, the type of action performed by the colleague is used as a factor. As another example, a rank or seniority of the colleague who has acted on the information item 104 is used as a factor. For example, scoring/ranking may be different depending on whether a colleague is the user's manager, direct report, someone who the user manages, etc., according to any particular enterprise structure. According to an aspect of the present disclosure, a factor used for ranking or scoring an information item 104 includes whether the information item 104 has been acted on by an elevated peer of the user for which the content feed 102 is being generated. Additionally, the type of action performed by the elevated peer is utilized as a factor.

Other examples of scoring/ranking factors include: a number of times a given information item 104 has been viewed by one or more persons, and the frequency of viewings of the information item 104; whether the information item 104 has been sent to the user for which the feed is being generated and, if so, by whom; an analysis of topics included in a given information item 104 (e.g., text strings from an information item 104 may be extracted and compared against text strings contained in other information items 104 already contained in the user's content feed 102 or contained in or associated with other information items 104 that have been previously ranked or scored sufficiently for inclusion in the content feed 102); and social interaction with the information item 104 (e.g., information showing that a given information item 104 has been commented on, liked, viewed, or otherwise utilized in a social network may be utilized in determining a scoring or ranking for a given information item 104). According to an aspect, one or more back-end or client side ranking modules are operable to monitor activities in a given enterprise at frequent, regular intervals including a monitoring of various information items 104 generated, received by, or sent from the enterprise for determining a set of information items 104 that should be added to the content feed 102 of a given user when the user next accesses the content feed 102.

Figure 3:
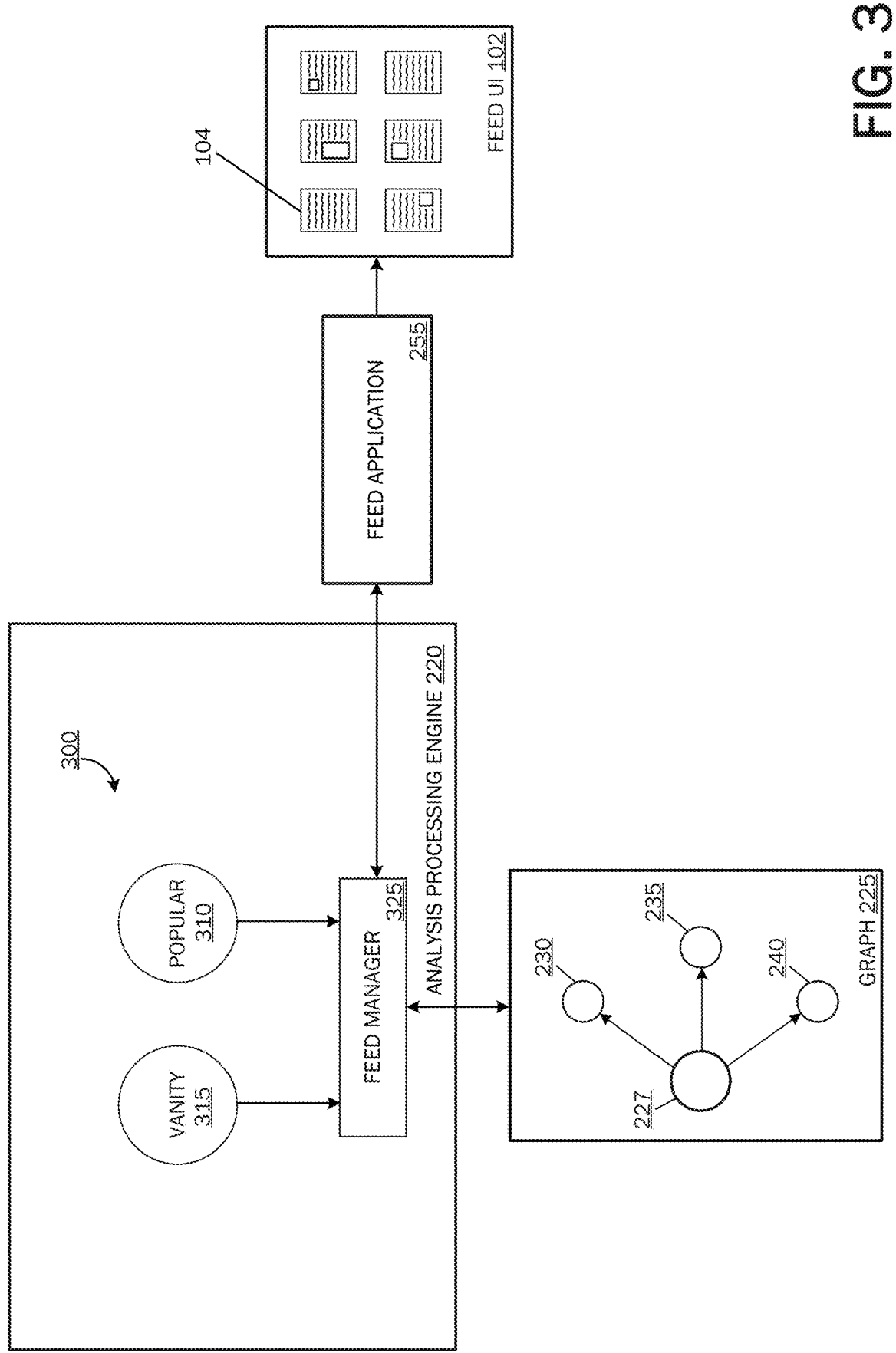
FIG. 3 illustrates an example of a back-end or client side ranking module or system.

Referring now to FIG. 3, one example of a back-end or client side ranking module or system 300 is illustrated. According to an aspect and as illustrated in FIG. 3, the system 300 operates as a part of the analysis processing engine 220 illustrated in FIG. 2. According to another aspect, the ranking system 300 operates remotely from the analysis processing engine 220, and the results of the system 300 are passed to or commanded by the analysis processing engine 220, as required.

According to aspects, the vanity module 315 is a ranking module, which is operable to calculate a score between a user and an information item 104 of which the user is a producer. This score is referred to as a person-document (PD) score. The score is calculated based on the number of recent views, edits or other interactions of the user with a given information item 104. For example, a document the user views every day, for example, a department spreadsheet, may receive a higher ranking than a document the user views once per quarter.

According to aspects, the system 300 comprises a popular module 310. According to an aspect, the popular module 310 is a ranking module, which is operable to estimate an importance of an information item 104 based on how popular the information item 104 is among the colleagues of the user. As should be appreciated, "popular with my colleagues" (PWMC) may sometimes be referred to as "popular in my circle" (PIMC). According to another aspect, the popular module 310 is operable to estimate an importance of an information item 104 based on whether the information item 104 has been acted on or is trending around distant peers of the user. Information items 104 are ranked by the popular module 310 and are categorized as PWMC items 106 or distant items 110 in a categorization process. As should be appreciated, any number of ranking modules may be utilized for assisting in the generation of a ranking or scoring for a given information item 104, as described herein.

Referring still to FIG. 3, after each of the ranking modules 310,315 provide a ranking or scoring for each information item 104, the rankings or scorings from each of the modules for each information item 104 is passed to a feed manager 325, which is operable to generate an overall ranking or score for each information item 104 with respect to a specific user. According to an aspect, the score or ranking is stored in the graph 225 for retrieval by the feed application 255 for population of information items 104 into a content feed 102.

According to an aspect, a posting rate of categorized content is determined by parameters associated with a minimal percentage of a specific content type (e.g., 20% distant content 110) and a maximum percentage of the specific content type (e.g., 40% distant content 110). According to an aspect, the feed manager 325 is operable to calculate the maximum number of information items 104 to post, which will be referred to as N.

According to an aspect, the vanity module 315 analyzes information items 104 created or modified by a specific user (i.e., vanity items 108), and creates a list of V items (e.g., list of 5 documents) with a highest event rate (i.e., access and/or use by individuals within the user's organization). According to this example, each time the feed manager 325 is run, it creates a new "Future" for the user. The "Future" includes one or more information items 104 to add to the content feed 102 when the user next accesses it. According to an aspect, the feed manager 325 then determines N-V information items 104 to post from the popular module 310. For example, the feed manager 325 may start at the top of the ranked list and iterate through it until it has found N-V documents not already in the feed 102 or until it reaches the end of the list. Next, the feed manager 325 may check that the percentage of distant content 110 is between the configured limits according to set parameters. If not, it may iterate further through the list to exchange the lowest ranked PWMC items 106 for distant items 110, or vice versa. According to an aspect, the feed manager 325 merges the vanity items 108 with the set of PWMC 106 and distant 110 items to pass to the feed application 255 for population into the user's feed 102.

As should be appreciated, this example is for purposes of illustration only as the portions of the given rankings or scores from any individual module 310,315 can be modified from time to time in order to generate a content feed 102 that is most relevant for a given user or class of users. For example, in a given enterprise, it may be determined that the scoring associated with the importance of an information item 104 based on its popularity among the colleagues of a given user is more valuable than the scoring associated with a document based on its production by the user for which the content feed 102 is being generated.

As briefly described above, with reference to FIG. 2, as information is gathered from the various sources 205, 210, 215 for presentation to a ranking system 300 as part of the analysis processing engine 220, the information is aggregated, and determinations of such information as the number of viewings of a given user for a given information item 104, the popularity of a given information item 104 among colleagues of a user and elevated peers of a user, comments or interactions with an information item 104 via social networks, and the like are determined. Such information for each information item 104 is aggregated for use by the ranking systems 300 as part of the analysis and processing engine 220, as described above with reference to FIG. 3.

Figure 4A:
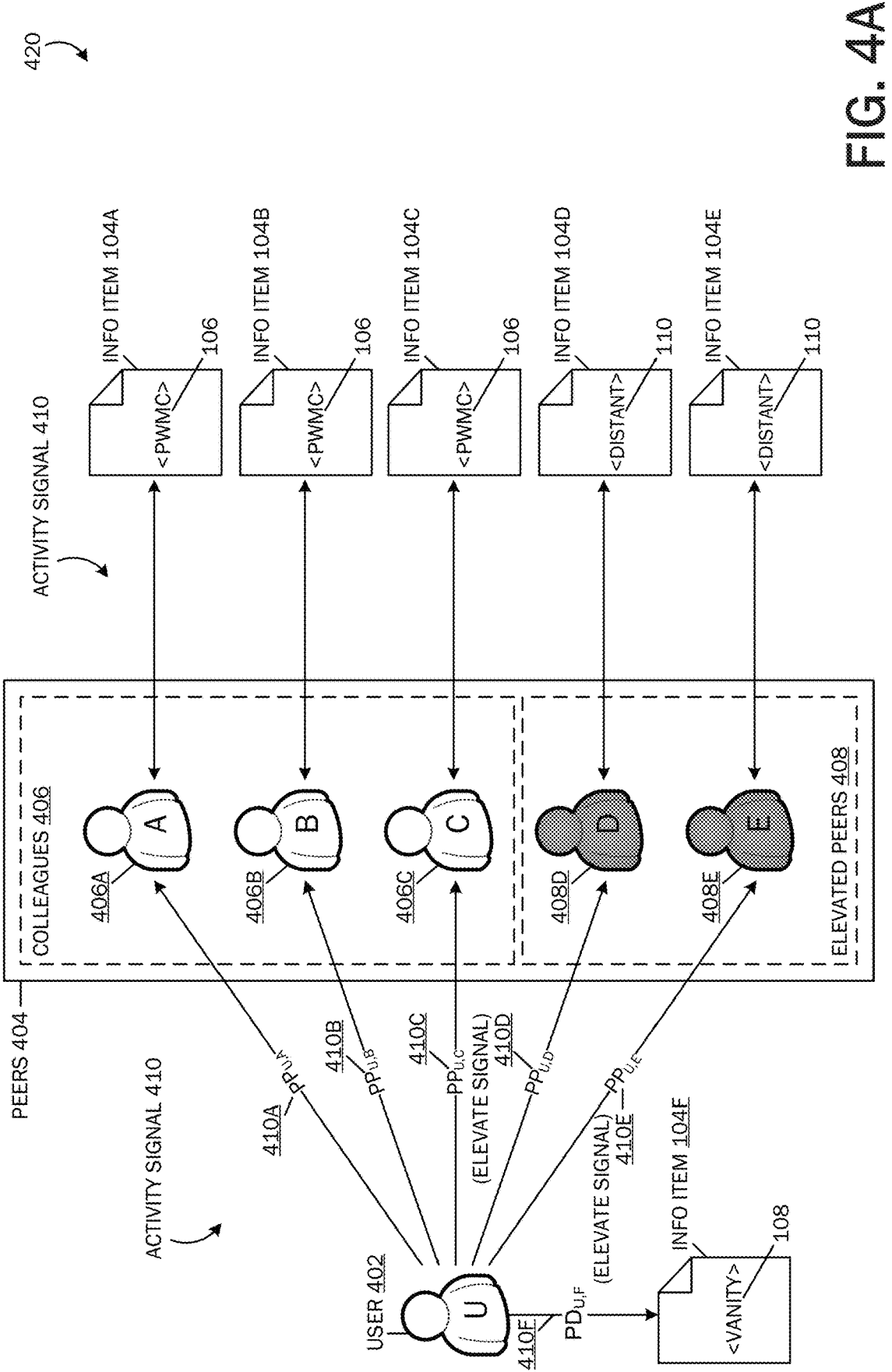
FIG. 4A illustrates an example model for ranking information items.

With reference now to FIG. 4A, an example model 420 for ranking information items 104 is illustrated. Through various activity signals 410A-F (collectively, 410), which are stored in the graph 225, a user 402 is enabled to be connected to various people in an enterprise (via person-person activity signals 410A-E) and to various information items 104 (via person-document activity signals 410F). The set of people with whom the user 402 is connected according to one or more person-person (PP) activity signals 410A-E is referred to as the user's peers 404. According to an aspect, a user's peers 404 are categorized either as colleagues 406A-C (collectively, 406) or as elevated peers 408D-E (collectively, 408).

According to an aspect, a peer 404 is defined as a colleague 406 when the peer 404 shares a close organizational relationship (e.g., manager, skip manager, directs, organizational chart colleague, etc.) with the user 402 (i.e., organization activity signal). According to another aspect, a peer 404 is defined as a colleague 406 when the user 402 and the peer 404 communicate with each other regularly according to frequency and recentness of communication interactions (e.g., emails, instant messages, etc.) between the user 402 and the peer 404. According to another aspect, a peer 404 is defined as a colleague 406 when the peer 404 works with the user 402 on a regular basis according to activity signals 410 between the user 402 and the peer 404, for example, coauthoring activity signals.

According to an aspect, a peer 404 is defined as an elevated peer 408 when an elevate signal 410D,E is created between the user 402 and the non-colleague peer 404. According to an aspect, an elevate signal 410D,E is created when a user 402 indicates an interest in a non-colleague peer 404 according to an activity signal 410 between them, for example, a meeting co-attendee activity signal (e.g., the user 402 and the peer 404 are co-attendees on a meeting invitation of an upcoming meeting), a follow activity signal (e.g., the user 402 follows the peer 404, the user 402 and the peer 404 follow a same person, etc.), a like activity signal (e.g., the user 402 likes an information item 104 authored by the peer 404, the user 402 and peer 404 both like a same information item 104, etc.), a read activity signal (e.g., user 402 reads an information item 104 authored by the peer 404, the user 402 and the peer 406 both read an information item 104 authored by a same person, etc.), etc. According to another aspect, a non-colleague peer 404 is defined as an elevated peer 408 when the user 402 and the non-colleague peer 404 communicate with each other non-regularly according to frequency and recentness of communication interactions (e.g., emails, instant messages, etc.) between the user 402 and the peer 404.

According to an aspect, an elevate activity signal 410D,E is generated between the user 402 and a given peer 404 when the user 402 selects an information item 104 associated with the peer 404 from the user's content feed 102. A received activity signal on promoted content is utilized as a reinforcement of the user's interest in the associated peer 404 (which, as described above, may be a colleague 406 or an elevated peer 408).

Additionally, a user 402 is enabled to select an individual and view a feed of information items 104 that are trending around the individual, for example, information items 104 that the individual has authored, modified, liked, commented on, shared, etc. According to an aspect, if the user 402 takes action on any one of the information items 104 surfaced in the feed (e.g., reads, likes, comments, shares, etc.), an elevate signal 410D,E is created, indicative of the user's interest in the information item 104 and in the individual. If the individual is not a colleague 406 of the user 402, the elevate signal 410D,E causes the individual to be defined as an elevated peer 408 of the user 402. For example, the user 402 may select to view a document that is trending around a given peer 404. The action of viewing the document is identified as a detection of interest, and an elevate signal 410D,E is generated between the user 402 and the peer 404. Accordingly, the peer 404 is defined and tagged as an elevated peer 408 of the user 402. According to an aspect, a feature weight is applied to person-person relationships according to whether a peer 404 is an elevated peer 408 or a colleague 406.

Relationships between the user 402 and the user's colleagues 406 and elevated peers 408, and between the user 402 and information items 104 are represented in a graph 225 in the form of edges, where the edges are representative of relationship types based on the activity signals 410 between the user 402 and the user's colleagues 406 and elevated peers 408, and between the user 402 and information items 104. According to an aspect, a time decay is applied to an elevate signal 410D,E based on the action/interaction for which the elevate signal 410D,E was generated. According to another aspect, a count and recentness of elevate signals 410D,E is utilized to influence the strength of a user's relationship with an elevated peer 408. For example, if there are multiple and recent elevate signals 410D,E between the user 402 and a given elevated peer 408, a higher score is attributed to the person-person edge between the user 402 and the given elevated peer 408.

According to an aspect and as briefly described above, information items 104 are categorized and tagged as "popular with my colleagues" or "PWMC" according to activity signals 410 between the user's colleagues 406 and the information items 104. For example, if a colleague 406A of the user 402 is a producer of an information item 104A (e.g., authors or modifies the information item 104A), is a recommender of an information item 104A (e.g., likes, views, or comments on the information item 104A), or is a proxy to an information item 104A (e.g., the information item 104A is popular with the colleague's colleagues), the information item 104A may be surfaced in the user's content feed 102 and identified and tagged as an information item that is "popular with my colleagues" or "PWMC" 106.

According to another aspect, information items 104 are categorized and tagged as "vanity" 108 according to activity signals 410 between the user 402 and the information items 104. For example, if the user 402 is a producer of an information item 104F (e.g., authors or modifies the information item 104F), and there is recent activity on the information item 104F by other individuals, the information item 104F may be surfaced in the user's content feed 102 and identified and tagged as an item that is a "vanity" 108 item. That is, a "vanity" 108 item is illustrative of an information item 104F that the user 402 has ownership of with which other peers 404 have interacted.

According to another aspect, information items 104 are categorized and tagged as "distant" 110 according to activity signals 410 between the user's elevated peers 408 and the information items 104. For example, if an elevated peer 408 of the user 402 is a producer of an information item 104A (e.g., authors or modifies the information item 104D), is a recommender of an information item 104D (e.g., likes, views, or comments on the information item 104D), or is a proxy to an information item 104D (e.g., the information item 104D is popular with the elevated peer's colleagues), the information item 104D may be surfaced in the user's content feed 102 and identified and tagged as an item that is a "distant" 110 item.

Figure 4B:
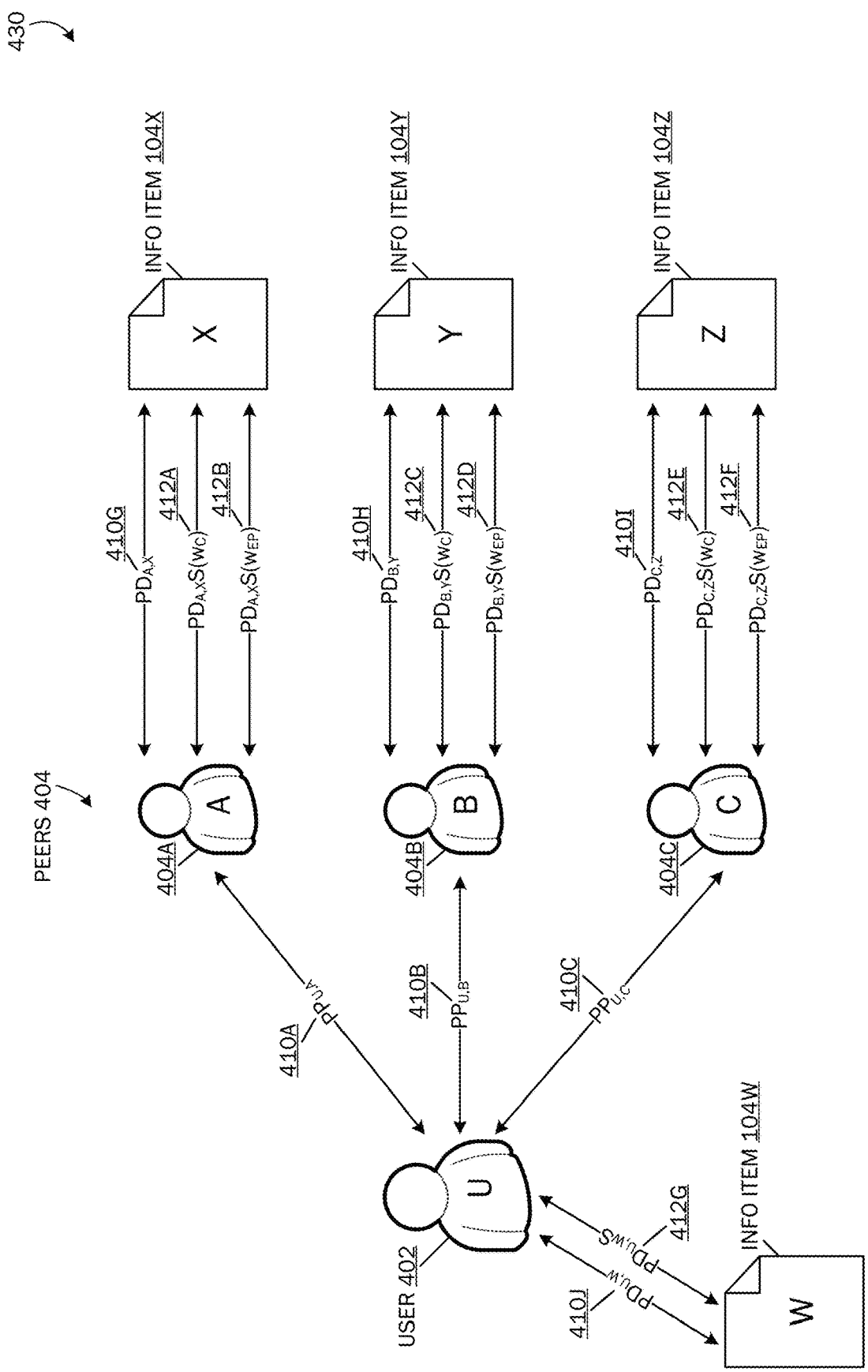
FIG. 4B illustrates an example model for ranking information items by calculating multiple person-document scores between a peer and an information item.

With reference now to FIG. 4B, an example model 430 for ranking information items 104 by calculating multiple person-document (PD) scores 412A-G (collectively, 412) between a user 402 and an information item 104 and between the user's peers 404 and an information item 104 is illustrated. According to aspects of the present disclosure, a person-document score 412G is calculated for information items 104W produced by the user 402 (person-document signal $PD_{U,W}$ 410J) and for information items 104X,Y,Z acted on by the user's peers 404A,B,C. For example, a person-document score 412 may be calculated for information items 104 viewed, modified, liked, commented on, shared, edited, etc. by the user 402, the user's colleagues 406, and the user's elevated peers 408. According to an aspect, the calculated person-document scores 412 are utilized for ranking information items 104 according to their interest and relevance to the user 402.

An activity signal 410 between a person (e.g., user 402 or peer 404) and an information item 104 is referred to as a person-document signal 410G-J ($PD_{ij}$), where information item j is content associated with person i. According to an aspect, a person-document score 412A-G (collectively 412) ($PD_{ij}S$) is calculated based on a weight of the action by the person i on the information item j (e.g., whether the person modifies the information item, views the information item, etc.). According to an aspect, different feature weights (w) are also applied to a person-document score depending on whether the peer 404 is a colleague 406 of the user 402 or an elevated peer 408 of the user 402. Accordingly, and as illustrated in FIG. 4B, two person-document scores 412 are calculated for each peer person-document signal 410G-I: one P-D score 412A,C,E calculated based on a colleague feature weight ($w_C$) and one P-D score 412B,D,F calculated based on an elevated peer feature weight ($w_{EP}$).

For example, consider that peer A 404A acts on information item X 104X. According to an aspect, the popular module 310 calculates two P-D scores 412A,B for the P-D activity signal ($PD_{A,X}$) 410G between peer A 404A and information item X 104X: a colleague P-D score ($PD_{A,X}S$ ($w_C$)) 412A based on a colleague feature weight ($w_C$), and an elevated peer P-D score ($PD_{A,X}S(w_{EP})$) 412b based on an elevated peer feature weight ($w_{EP}$). According to an aspect, colleague P-D scores ($PD_{A,X}S(w_C)$) 412A,C,E and elevated peer P-D scores ($PD_{A,X}S(w_{EP})$) 412B,D,F are passed to the feed manager 325, and stored in the graph 225. When summing over peers 404 for retrieval and population of information items 104 into the user's content feed 102, the feed manager 325 is operable to select the correct P-D score to use based on the colleague or elevated peer status of the peer 404.

Figure 4C:
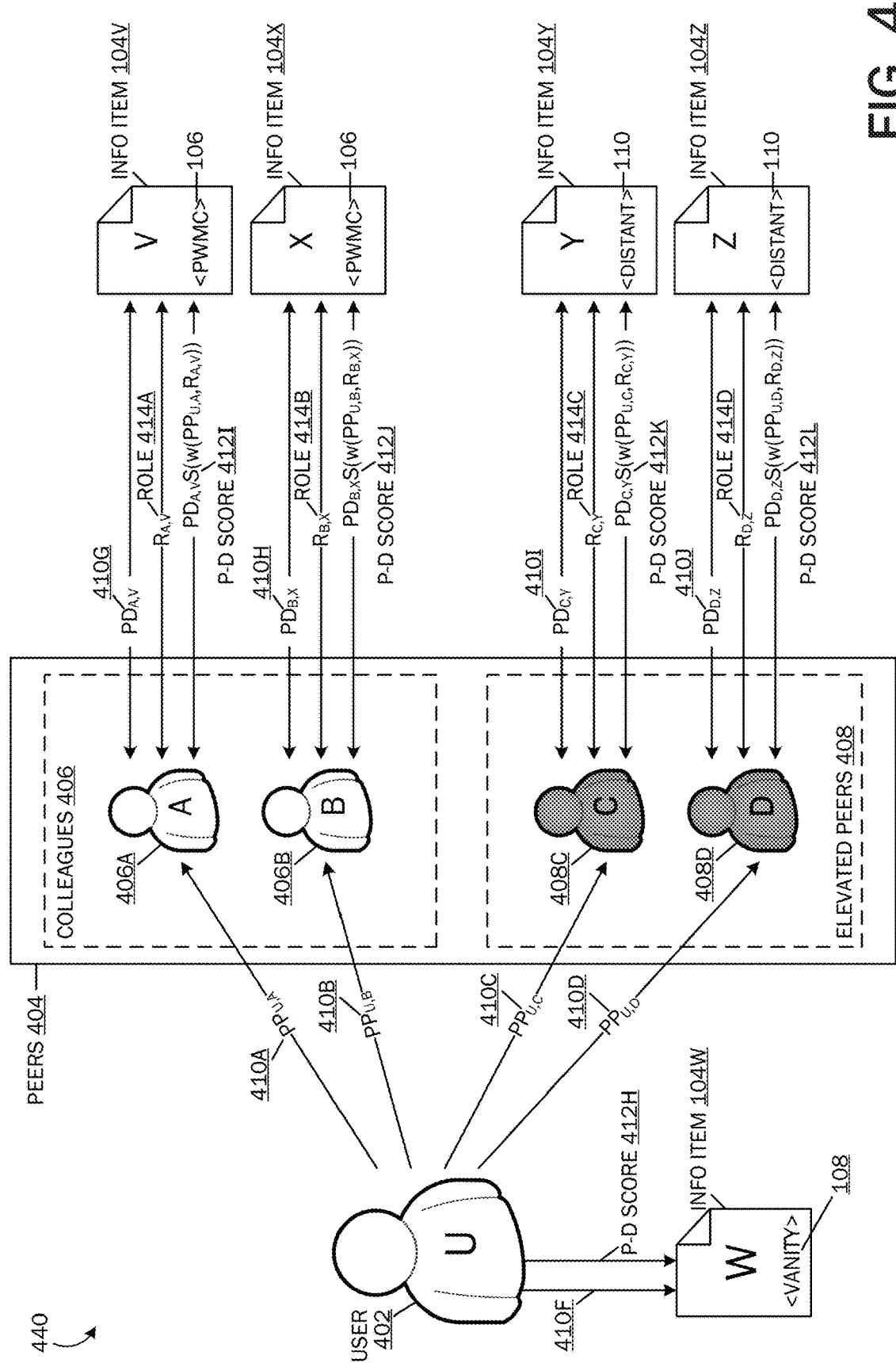
FIG. 4C illustrates an example model for separating distant peers from close peers based on peer roles.
Figure 5:
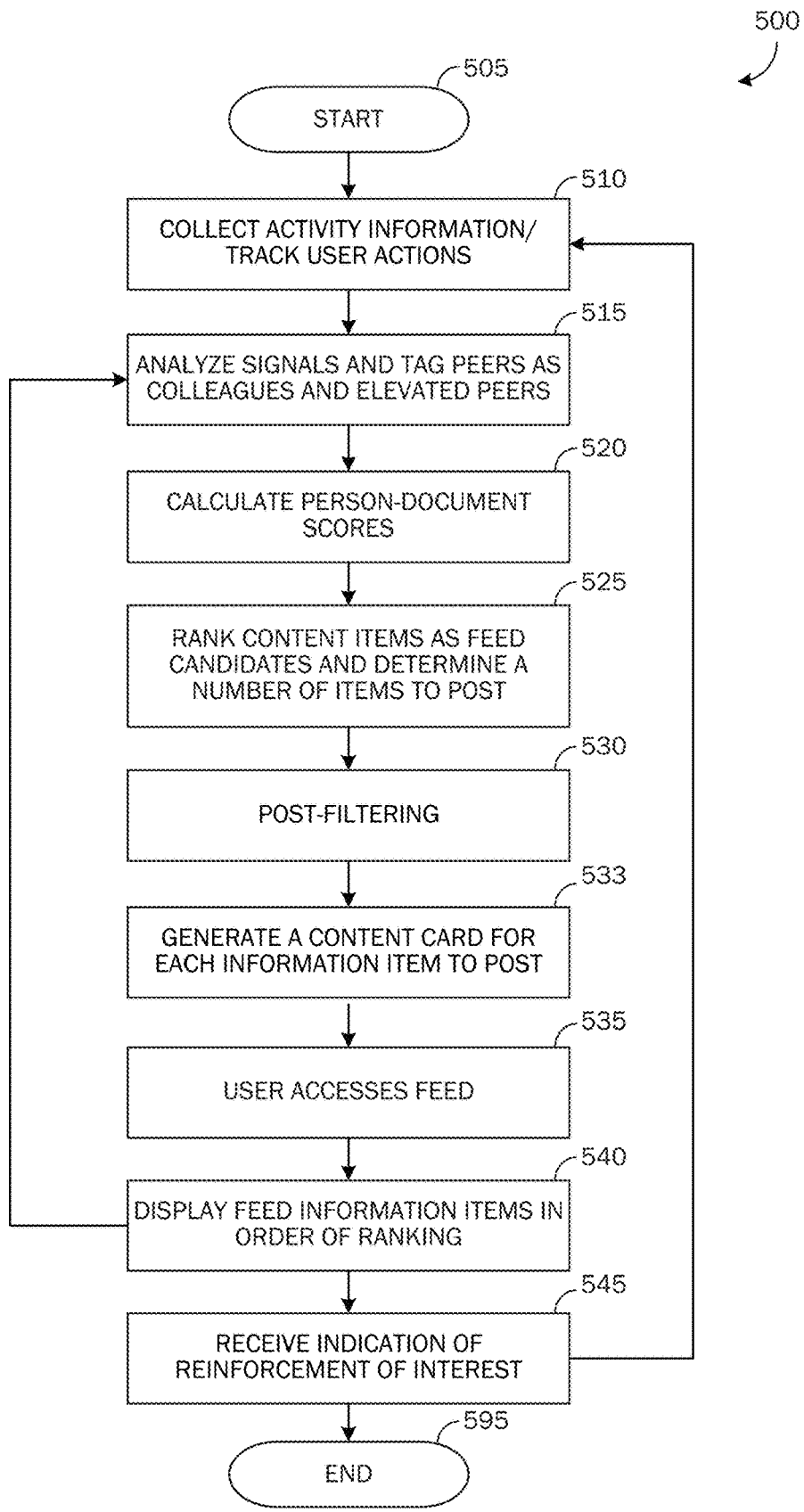
FIG. 5 illustrates an operational flow for surfacing distant relevant information to a user in a content feed.

According to another aspect, a model, such as the example model 440 illustrated in FIG. 4C, is utilized for separating distant peers from close peers based on peer roles. Accordingly, information items 104 are ranked using a peer-role weight for each P-D action. According to an aspect 440, each peer 404 of the user 402 is enabled to have multiple roles at a same time, but with different weights. For example, a peer 404 may have the role of a producer of content (e.g., creating an information item 104, modifying an information item, etc.), the role of a recommender of content (e.g., liking an information item 104, viewing an information item, commenting on an information item, etc.), or the role of a proxy of content (e.g., an information item 104 is popular with the peer's colleagues). A user 402 may have in interest in a peer 404 in the role of producer if the user 402 is interested in the peer's content; the user 402 may have an interest in a peer 404 in the role of recommender if the user 402 shares interests with the peer 404; and the user 402 may have an interest in a peer 404 in the role of proxy if the user 402 is interested in what is trending around the peer 404. According to an aspect, the popular module 310 is operable to use each P-D signal 410G-J between a peer 404 and an information item 104 to calculate a P-D score 4121-L according to the role 414A-D (i.e., producer, recommender, proxy) of the peer 404 with respect to the information item 104V-Z and according to the P-P signal 410A-D between the user 402 and the peer 404.

For each P-P signal 410A-D, the popular module 310 is operable to calculate a score for each of the three roles 414A-D. For example, refer to the example table below:

TABLE 1

P-P Signal Score by Role

| P-P Signal | Producer | Recommender | Proxy |
|---|---|---|---|
| Follow | 300 | 100 | 0 |
| Distribution List Peer | 0 | 200 | 200 |
| Recipient Cache | 500-1000 | 500-1000 | 300 |
| OrgChart Manager | 500 | 500 | 0 |
| OrgChart SkipManager | 500 | 300 | 0 |
| OrgChart Direct | 500 | 500 | 0 |
| OrgChart Colleague | 500 | 500 | 0 |
| CoAuthor | 700 | 500 | 0 |
| Elevated | 200 | 0 | 800 |
| RecentReadDocByAuthor | 700 | 0 | 200 |
| RecentlyLikedSameDocs | 0 | 700 | 0 |

According to an aspect, the popular module 310 uses a peer weight for the corresponding role 414A-D to calculate a rank score of each information item 104 for a specific user 402.

Having described an operating environment and various aspects of aspects of the invention with respect to FIGS. 1-4, FIG. 5 is a flow chart illustrating a method for surfacing distant interesting information items 104 to a user 402 in a content feed 102. The routine 500 begins at start OPERATION 505 and proceeds to OPERATION 510, where users' explicit actions are tracked, for example, people's pages that users visit, information items 104 that users view, modify, follow, etc., people with whom users communicate, etc. As described above, the actions are stored in the graph 225 in the form of edges, where the edges are representative of relationship types based on activity signals between users (including the user 402 for whom the content feed 102 is being created) and between users and information items 104.

At OPERATION 515, signals between the user 402 and information items 104 and between the user 402 and people/peers 404 associated with the information items 104 on which he/she has acted are analyzed. Depending on factors such as the activity, frequency of the activity, recentness of the activity, an organizational structure, etc., the peers 404 are categorized and tagged as either colleagues 406 of the user 402 or as elevated peers 408 as described above. According to an aspect, OPERATION 515 occurs after OPERATION 520 (described below).

At OPERATION 520, the ranking modules 310,315 calculate person-document (P-D) scores 412. According to an aspect, the popular module 310 calculates two person-document scores 412 for each information item 104: a colleague P-D score ($PD_{A,x}S(w_C)$) 412A based on a colleague feature weight ($w_C$), and an elevated peer P-D score ($PD_{A,x}S(w_{EP})$) 412B based on an elevated peer feature weight ($w_{EP}$). According to another aspect, the popular module 310 calculates a person-document score 412 for each information item 104 based on a categorization of a peer 404 to the user 402 as determined in OPERATION 515.

At OPERATION 525, the ranking or scoring system 300 operating in association with the analysis processing engine 220 ranks each information item 104 as a feed candidate using the correct person-document score based on the colleague or elevated peer status of the peer 404. According to an aspect, a determination is made as to a number of information items 104 to post and of which type (e.g., vanity 108, PWMC 106, distant 110).

At OPERATION 530, a post-filtering operation occurs. For example, the percentage of distant documents 110 may be checked to keep the percentage of distant documents 110 within a given threshold. As another example of a post-filtering operation, a check may be made to ensure that formation items 104 from a given elevated peer's 208 circle are surfaced in the content feed 102. As should be appreciated, any information items 104 not included in graph 225 owing to the lack of a sufficient scoring or ranking are not discarded, but are maintained for subsequent analysis relative to other items that subsequently may be considered as feed candidates.

At OPERATION 533, the feed application 255 generates a content card for each information item 104 selected to be posted in the user's content feed 102. As described above, a content card is a graphical representation of an information item 104, and comprises at least one of: a header, a title, a preview image of the information item 104, information associated with why the information item 104 is relevant to the user 402 (e.g., a tag), and a selectable link to access the information item 104.

At OPERATION 535, the user 402 accesses his/her content feed 102 via the feed application 255 or via a feed access application 250, 260, illustrated and described above with reference to FIG. 2. At operation 540, the information items 104 selected for inclusion in the feed for the user 402 are displayed as a content feed 102 in a content feed user interface in order of the ranking or scoring applied to each information item 104, as illustrated in FIG. 1. Additionally, for each information item 104, a tag indicating why the particular information item is posted in the user's feed 102 is generated and displayed in the user interface. For example, a tag may include a "viewed by me" tag, a "popular with my colleagues" tag, a "popular with an elevated user's colleagues" tag, etc.

At optional OPERATION 545, an indication of reinforcement of interest is received. For example, the user 402 may select an information item 104 associated with a given elevated user 408 posted in his/her content feed 102. Accordingly, the selection of the information item 104 is construed as a reinforcement of the user's interest in the given elevated user 408, and additional information items 104 associated with the given elevated peer 408 may be included in the user's content feed 102. The method 500 ends at OPERATION 595.

While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which aspects of the invention are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 6:
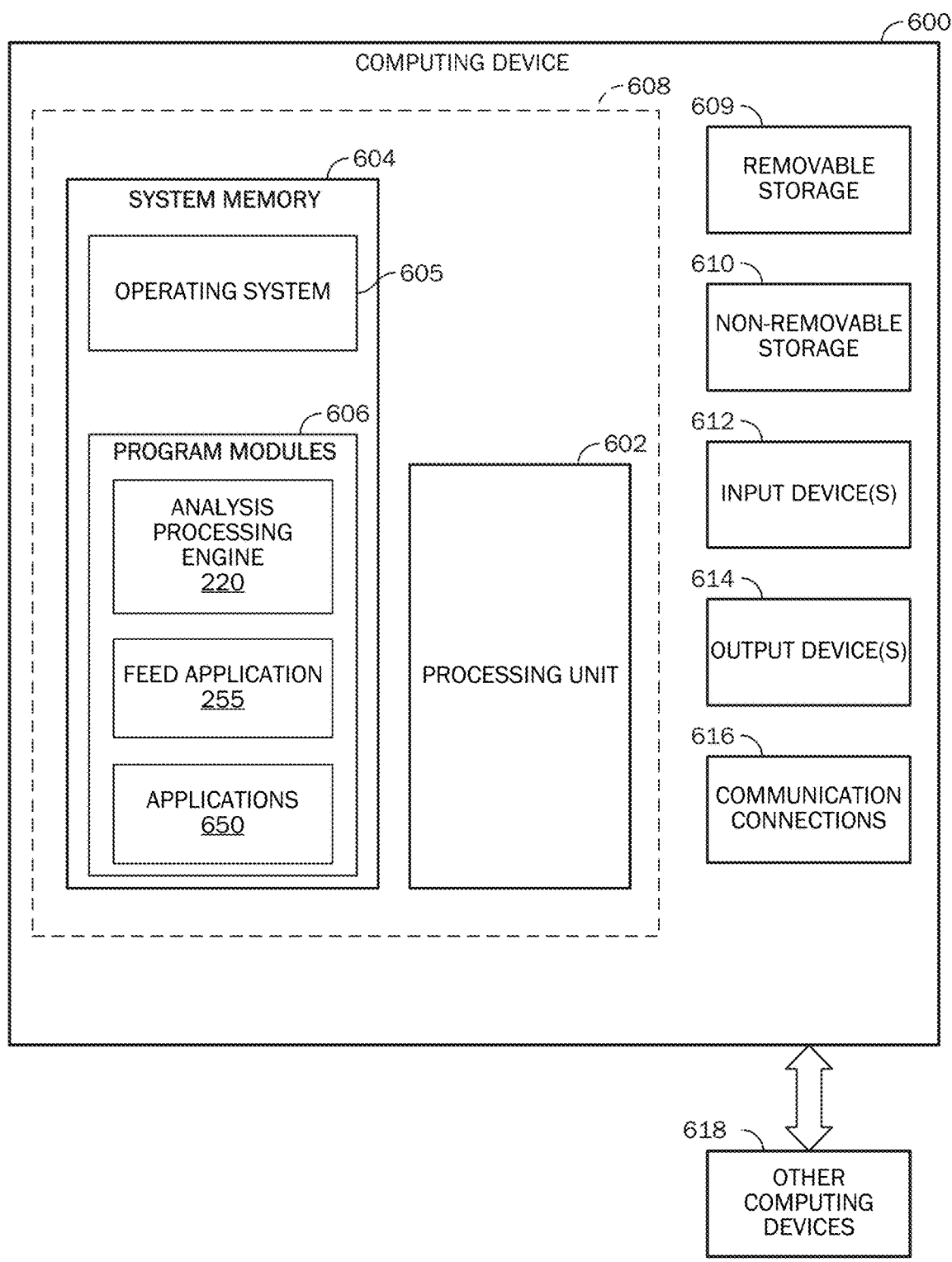
FIG. 6 is a block diagram illustrating example physical components of a computing device with which aspects of the invention may be practiced.
Figure 7A:
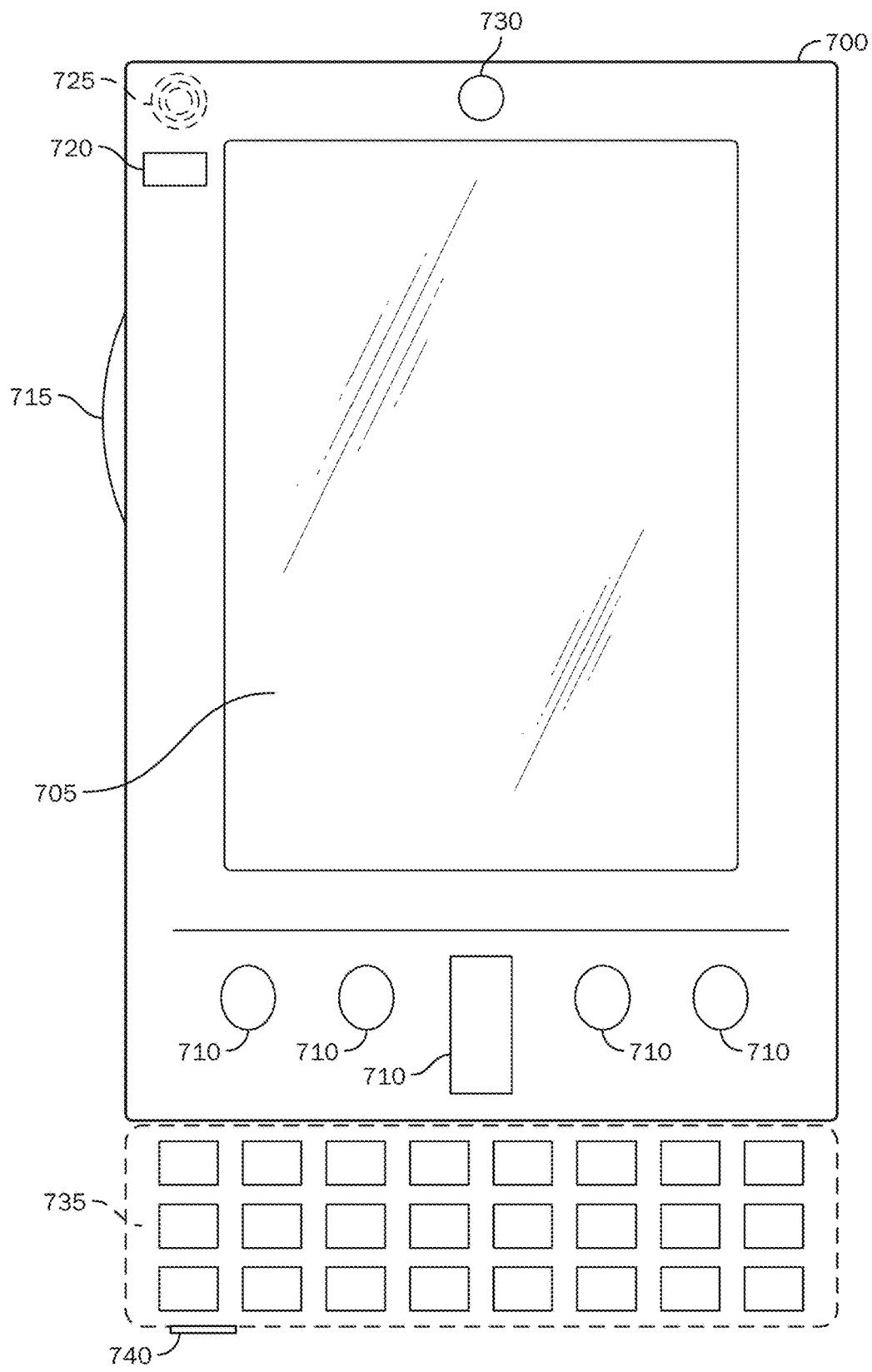
FIGS. 7A and 7B are simplified block diagrams of a mobile computing device with which aspects of the present invention may be practiced.
Figure 7B:
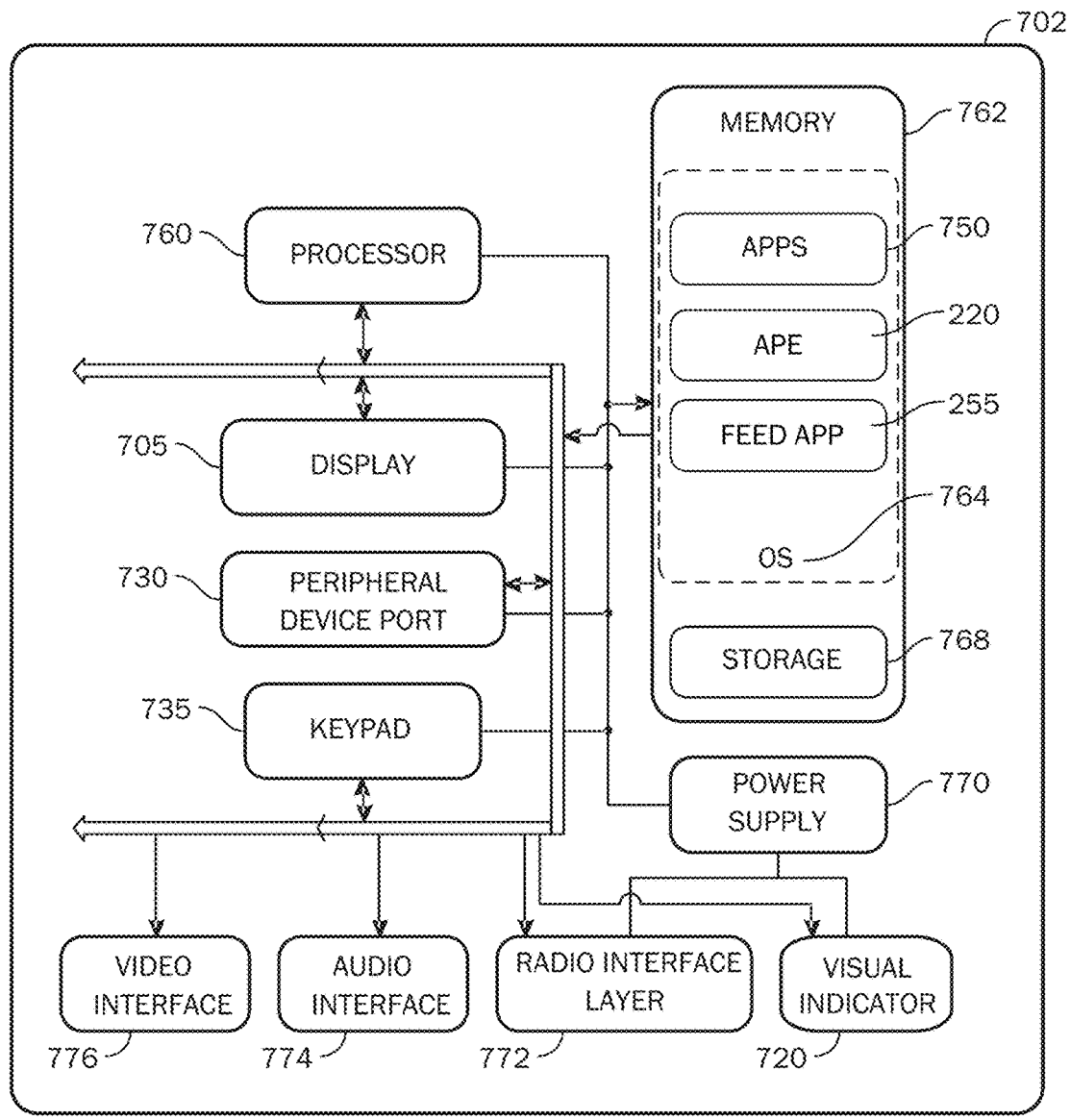
Figure 8:
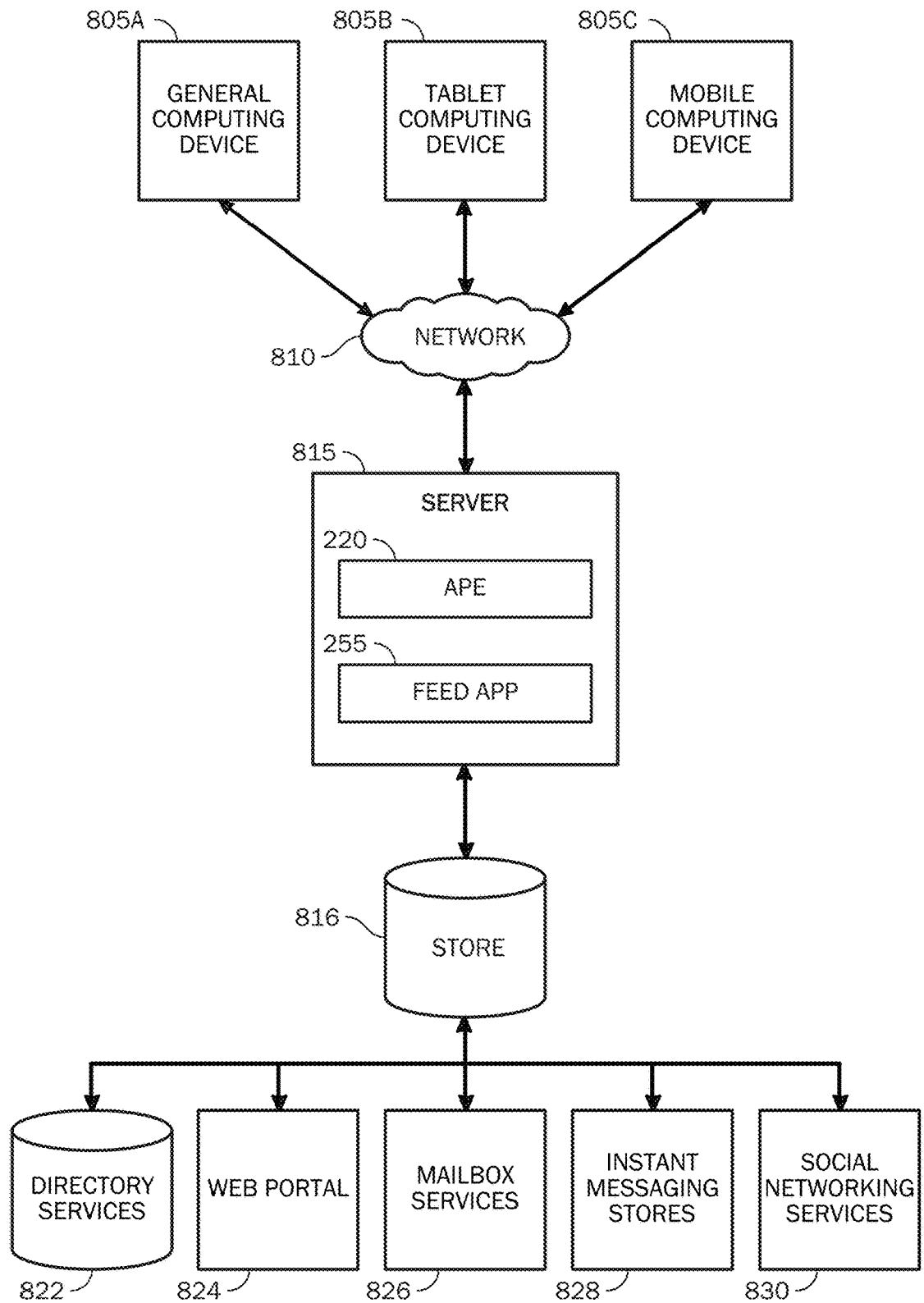
FIG. 8 is a simplified block diagram of a distributed computing system in which aspects of the present invention may be practiced.

FIG. 6-8 and the associated descriptions provide a discussion of a variety of operating environments in which examples of the invention are practiced. However, the devices and systems illustrated and discussed with respect to FIGS. 6-8 are for purposes of example and illustration and are not limiting of a vast number of computing device configurations that are utilized for practicing aspects of the invention, described herein.

FIG. 6 is a block diagram illustrating physical components (i.e., hardware) of a computing device 600 with which examples of the present disclosure are be practiced. In a basic configuration, the computing device 600 includes at least one processing unit 602 and a system memory 604. According to an aspect, depending on the configuration and type of computing device, the system memory 604 comprises, but is not limited to, volatile storage (e.g., random access memory), non-volatile storage (e.g., read-only memory), flash memory, or any combination of such memories. According to an aspect, the system memory 604 includes an operating system 605 and one or more programming modules 606 suitable for running software applications 650. According to an aspect, the system memory 604 includes the analysis processing engine 220. According to another aspect, the system memory 604 includes the feed application 255. The operating system 605, for example, is suitable for controlling the operation of the computing device 600. Furthermore, aspects of the invention are practiced in conjunction with a graphics library, other operating systems, or any other application program, and is not limited to any particular application or system. This basic configuration is illustrated in FIG. 6 by those components within a dashed line 608. According to an aspect, the computing device 600 has additional features or functionality. For example, according to an aspect, the computing device 600 includes additional data storage devices (removable and/or non-removable) such as, for example, magnetic disks, optical disks, or tape. Such additional storage is illustrated in FIG. 6 by a removable storage device 609 and a non-removable storage device 610.

As stated above, according to an aspect, a number of program modules and data files are stored in the system memory 604. While executing on the processing unit 602, the program modules 606 (e.g., analysis processing engine 220, feed application 255) perform processes including, but not limited to, one or more of the stages of the method 500 illustrated in FIG. 5. According to an aspect, other program modules are used in accordance with examples of the present invention and include applications such as electronic mail and contacts applications, word processing applications, spreadsheet applications, database applications, slide presentation applications, drawing or computer-aided application programs, etc.

According to an aspect, aspects of the invention are practiced in an electrical circuit comprising discrete electronic elements, packaged or integrated electronic chips containing logic gates, a circuit utilizing a microprocessor, or on a single chip containing electronic elements or microprocessors. For example, aspects of the invention are practiced via a system-on-a-chip (SOC) where each or many of the components illustrated in FIG. 6 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 600 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects of the invention are practiced within a general purpose computer or in any other circuits or systems.

According to an aspect, the computing device 600 has one or more input device(s) 612 such as a keyboard, a mouse, a pen, a sound input device, a touch input device, etc. The output device(s) 614 such as a display, speakers, a printer, etc. are also included according to an aspect. The aforementioned devices are examples and others may be used. According to an aspect, the computing device 600 includes one or more communication connections 616 allowing communications with other computing devices 618. Examples of suitable communication connections 616 include, but are not limited to, RF transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. According to an aspect, any such computer storage media is part of the computing device 600. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 7A and 7B illustrate a mobile computing device 700, for example, a mobile telephone, a smart phone, a tablet personal computer, a laptop computer, and the like, with which aspects of the invention may be practiced. With reference to FIG. 7A, an example of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. According to an aspect, the display 705 of the mobile computing device 700 functions as an input device (e.g., a touch screen display). If included, an optional side input element 715 allows further user input. According to an aspect, the side input element 715 is a rotary switch, a button, or any other type of manual input element. In alternative examples, mobile computing device 700 incorporates more or less input elements. For example, the display 705 may not be a touch screen in some examples. In alternative examples, the mobile computing device 700 is a portable phone system, such as a cellular phone. According to an aspect, the mobile computing device 700 includes an optional keypad 735. According to an aspect, the optional keypad 735 is a physical keypad. According to another aspect, the optional keypad 735 is a "soft" keypad generated on the touch screen display. In various aspects, the output elements include the display 705 for showing a graphical user interface (GUI), a visual indicator 720 (e.g., a light emitting diode), and/or an audio transducer 725 (e.g., a speaker). In some examples, the mobile computing device 700 incorporates a vibration transducer for providing the user with tactile feedback. In yet another example, the mobile computing device 700 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 700 incorporates peripheral device port 740, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one example of a mobile computing device. That is, the mobile computing device 700 incorporates a system (i.e., an architecture) 702 to implement some examples. In one example, the system 702 is implemented as a "smart phone" capable of running one or more applications (e.g., browser, e-mail, calendaring, contact managers, messaging clients, games, and media clients/players). In some examples, the system 702 is integrated as a computing device, such as an integrated personal digital assistant (PDA) and wireless phone.

According to an aspect, one or more application programs 750 are loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. According to an aspect, the analysis processing engine 220 is loaded into memory 762. According to another aspect, the feed application 255 is loaded into memory 762. The system 702 also includes a non-volatile storage area 768 within the memory 762. The non-volatile storage area 768 is used to store persistent information that should not be lost if the system 702 is powered down. The application programs 750 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700.

According to an aspect, the system 702 has a power supply 770, which is implemented as one or more batteries. According to an aspect, the power supply 770 further includes an external power source, such as an AC adapter or a powered docking cradle that supplements or recharges the batteries.

According to an aspect, the system 702 includes a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 750 via the operating system 764, and vice versa.

According to an aspect, the visual indicator 720 is used to provide visual notifications and/or an audio interface 774 is used for producing audible notifications via the audio transducer 725. In the illustrated example, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. According to an aspect, the system 702 further includes a video interface 776 that enables an operation of an on-board camera 730 to record still images, video stream, and the like.

According to an aspect, a mobile computing device 700 implementing the system 702 has additional features or functionality. For example, the mobile computing device 700 includes additional data storage devices (removable and/or non-removable) such as, magnetic disks, optical disks, or tape. Such additional storage is illustrated in FIG. 7B by the non-volatile storage area 768.

According to an aspect, data/information generated or captured by the mobile computing device 700 and stored via the system 702 is stored locally on the mobile computing device 700, as described above. According to another aspect, the data is stored on any number of storage media that is accessible by the device via the radio 772 or via a wired connection between the mobile computing device 700 and a separate computing device associated with the mobile computing device 700, for example, a server computer in a distributed computing network, such as the Internet. As should be appreciated such data/information is accessible via the mobile computing device 700 via the radio 772 or via a distributed computing network. Similarly, according to an aspect, such data/information is readily transferred between computing devices for storage and use according to well-known data/information transfer and storage means, including electronic mail and collaborative data/information sharing systems.

FIG. 8 illustrates one example of the architecture of a system for surfacing distant relevant information to a user 402 in a content feed 102 as described above. Content developed, interacted with, or edited in association with the analysis processing engine 220 or the feed application 255 is enabled to be stored in different communication channels or other storage types. For example, various documents may be stored using a directory service 822, a web portal 824, a mailbox service 826, an instant messaging store 828, or a social networking site 830. The analysis processing engine 220 or the feed application 255 is operable to use any of these types of systems or the like for surfacing distant relevant information to a user 402 in a content feed 102, as described herein. According to an aspect, a server 815 provides the analysis processing engine 220 or the feed application 255 to clients 805A,B,C. As one example, the server 815 is a web server providing the analysis processing engine 220 or the feed application 255 over the web. The server 815 provides the analysis processing engine 220 or the feed application 255 over the web to clients 805 through a network 810. By way of example, the client computing device is implemented and embodied in a personal computer 805A, a tablet computing device 805B or a mobile computing device 805C (e.g., a smart phone), or other computing device. Any of these examples of the client computing device are operable to obtain content from the store 816.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope of the invention as claimed in any way. The aspects, examples, and details provided in this application are considered sufficient to convey possession and enable others to make and use the best mode of claimed invention. The claimed invention should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the claimed invention.

We claim:

1. A computer-implemented method for providing relevant information in a content feed to a user, comprising:

collecting activity signals between the user and content items associated with one or more other individuals with whom the user is not closely related;

analyzing the collected activity signals to identify a set of the content items as distant information items based on a level of activity between the user and the one or more other individuals;

calculating a score for each of the identified distant information items, wherein the score is calculated based on a categorization of the one or more other individuals to the user;

based on the calculated scores, ranking the identified distant information items for inclusion in the content feed to the user;

determining, based on the ranked, whether the identified distant information items are content feed candidates; and responsive to a positive determination that an identified distant information item is a content feed candidate, generating a content card for the identified distant information item for display in the user's content feed.

2. The computer-implemented method of claim 1, wherein the activity signals comprise one or more of:
a read activity signal;
a like activity signal; and
a follow activity signal.

3. The computer-implemented method of claim 1, wherein the one or more other individuals with whom the user is not closely related comprises:
individuals with whom the user does not share a close organizational relationship, or
individuals with whom the user does not regularly communicate.

4. The computer-implemented method of claim 3, wherein the distant information items comprise:
an information item authored by an individual with whom the user is not closely related;
an information item modified by an individual with whom the user is not closely related; or
an information item recommended by an individual with whom the user is not closely related.

5. The computer-implemented method of claim 1, wherein the categorization of the other individuals to the user is based on a relationship between the other individuals and the user.

6. The computer-implemented method of claim 1, wherein the score for a particular identified distant information item is calculated based on one or more of:
an attribute of the particular identified distant information item;
an activity performed on the particular identified distant information item; and
a relationship between individuals associated with the particular identified distant information item and the user.

7. The computer-implemented method of claim 1, wherein determining whether the identified distant information items are content feed candidates comprises:
determining a percentage threshold of distant information items to include in the content feed; and
adding the identified distant information items to the content feed in order of their ranking starting with a highest ranked distant information item until the determined percentage of identified distant information items to include in the content feed is reached.

8. The computer-implemented method of claim 1, further comprising:

receiving an indication of a selection to display the content feed;
displaying the content feed to the user;
receiving an indication of a selection of a distant information item from the content feed; and
providing user access to the selected distant information item.

9. A system for surfacing distant relevant information to a user in a content feed, comprising:
one or more processors;
memory storing one or more engines executable by the one or more processors, the one or more engines comprising:
an analysis processing engine operable to:
collect activity signals between the user and content items associated with one or more other individuals with whom the user is not closely related;
analyze the collected activity signals to identify a set of the content items as distant information items based on a level of activity between the user and the one or more other individuals;
calculating a score for each of the identified distant information items, wherein the score is calculated based on a categorization of the one or more other individuals to the user;
based on the calculated scores, rank the identified distant information items for inclusion in the content feed to the user;
determine, based on the ranking, whether the identified distant information items are content feed candidates; and
responsive to a positive determination that an identified distant information item is a content feed candidate, generate a content card for the identified distant information item for display in the user's content feed; and
a feed application operable to generate a content card for one or more of the distant information items for display in the content feed in response to a positive determination that a distant information item of the identified distant information items is a content feed candidate.

10. The system of claim 9, wherein the activity signals comprise one or more of:
a read activity signal;
a like activity signal; and
a follow activity signal.

11. The system of claim 9, wherein the one or more other individuals with whom the user is not closely related comprises:
individuals with whom the user does not share a close organizational relationship, or
individuals with whom the user does not regularly communicate.

12. The system of claim 11, wherein the distant information items comprise:
an information item authored by an individual with whom the user is not closely related;
an information item modified by an individual with whom the user is not closely related; or
an information item recommended by an individual with whom the user is not closely related.

13. The system of claim 9, wherein the score for a particular identified distant information item is calculated based on one or more of:
an attribute of the particular identified distant information item;
an activity performed on the particular identified distant information item; and
a relationship between individuals associated with the particular identified distant information item and the user.

14. The system of claim 9, wherein the analysis processing engine is further operable to:
receive an indication of a selection to display the content feed;
display the content feed to the user;
receive an indication of a selection of a distant information item from the content feed; and
provide user access to the selected distant information item.

15. A non-transitory computer readable storage media storing computer readable instructions which, when used by one or more computing devices, cause the one or more computing devices to perform a method for providing distant relevant information to a user in a content feed, the method comprising:
collecting activity signals between the user and content items associated with one or more other individuals with whom the user is not closely related;
analyzing the collected activity signals to identify a set of the content items as distant information items based on a level of activity between the user and the one or more other individuals;
calculating a score for each of the identified distant information items, wherein the score is calculated based on a categorization of the one or more other individuals to the user;
based on the calculated scores, ranking the identified distant information items for inclusion in the content feed to the user;
determining, based on the ranking, whether the identified distant information items are content feed candidates; and
responsive to a positive determination that an identified distant information item is a content feed candidate, generating a content card for the identified distant information item for display in the user's content feed.

16. The computer readable storage media of claim 15, wherein the distant information items comprise:
an information item authored by an individual with whom the user is not closely related;
an information item modified by an individual with whom the user is not closely related; or
an information item recommended by an individual with whom the user is not closely related.

17. The computer readable storage media of claim 15, wherein the categorization of the other individuals to the user is based on a relationship between the other individuals and the user.

18. The computer readable storage media of claim 15, wherein the score for a particular identified distant information item is calculated based on one or more of:
an attribute of the particular identified distant information item;
an activity performed on the particular identified distant information item; and
a relationship between individuals associated with the particular identified distant information item and the user.

19. The computer readable storage media of claim 15, wherein determining whether the identified distant information items are content feed candidates comprises:

determining a percentage threshold of distant information items to include in the content feed; and adding the identified distant information items to the content feed in order of their ranking starting with a highest ranked distant information item until the determined percentage of identified distant information items to include in the content feed is reached.

20. The computer readable storage media of claim 15, where in the method further comprises:

receiving an indication of a selection to display the content feed;

displaying the content feed;

receiving an indication of a selection of a distant information item from the displayed content feed;

providing access to the selected distant information item;

determining that the selection of the distant information item is an indication of interest of the user in an individual associated with the selected distant information item; and continuing to include distant information items associated with the associated individual in the user's content feed.

\* \* \* \* \*